(12) United States Patent
Kraft et al.

(10) Patent No.: US 6,727,922 B2
(45) Date of Patent: Apr. 27, 2004

(54) GUI FOR REPRESENTING ENTITY MATCHES UTILIZING GRAPHICAL TRANSITIONS PERFORMED DIRECTLY ON THE MATCHING OBJECT

(75) Inventors: Reiner Kraft, Gilroy, CA (US); David Arthur McKenzie, Jr., Troy, NY (US); Muta'Ali Abdullah Muhammad, Brewster, NY (US); Joann Ruvolo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 494 days.

(21) Appl. No.: 09/788,635

(22) Filed: Feb. 21, 2001

(65) Prior Publication Data

US 2002/0145630 A1 Oct. 10, 2002

(51) Int. Cl.[7] .............................. G06F 3/14; G06F 17/30
(52) U.S. Cl. ....................... 345/835; 345/968; 345/839; 345/837; 345/428; 707/6; 707/3
(58) Field of Search ................................. 345/839, 835, 345/968, 744, 746, 772, 764, 765, 837, 838, 440, 428, 581, 582, 647; 707/6, 104.1, 10, 3

(56) References Cited

U.S. PATENT DOCUMENTS

| | | | | |
|---|---|---|---|---|
| 5,982,369 A | * | 11/1999 | Sciammarella et al. | 345/835 |
| 6,160,553 A | * | 12/2000 | Robertson et al. | 345/838 X |
| 6,166,738 A | * | 12/2000 | Robertson et al. | 345/839 |
| 6,188,405 B1 | * | 2/2001 | Czerwinski et al. | 345/764 |
| 6,222,540 B1 | * | 4/2001 | Sacerdoti | 345/581 |
| 6,243,093 B1 | * | 6/2001 | Czerwinski et al. | 345/764 X |
| 6,574,620 B2 | * | 6/2003 | Borovoy et al. | 707/3 |
| 6,574,632 B2 | * | 6/2003 | Fox et al. | 707/10 X |

* cited by examiner

Primary Examiner—Raymond J. Bayerl
(74) Attorney, Agent, or Firm—Lacasse & Associates, LLC; Randy W. Lacasse; Leonard Guzman

(57) ABSTRACT

Graphical user interface (GUI) is used to represent entity matches via graphical transition of a matching object based on type of entity and match rating. First, a user requests a match determination, and this request can be queried via various means including a search engine. Next, a match rating is obtained from a source such as a search engine. Furthermore, a transition technique is selected which defines the kind of transition that is to be applied to the match object. Lastly, the graphical user interface (GUI) renders a graphical transition of the match object based on the resultant match rating. Transition techniques such as blurring, composite, and fantasy are used.

17 Claims, 14 Drawing Sheets

SEARCH    (granularity)

Collections searched: US 8 of 1,403,861 documents matched          1-8

| Document Number | Title | Score (Out of 5 Stars) |
|---|---|---|
| 125467 | A | ***** |
| 737611 | B | **** |
| 391708 | C | *** |
| 341055 | D | *** |
| 002874 | E | ** |
| 426512 | F | ** |
| 521945 | G | ** |
| 628707 | H | * |

GUI FOR REPRESENTING ENTITY MATCHES UTILIZING GRAPHICAL TRANSITIONS PERFORMED DIRECTLY ON THE MATCHING OBJECT

BACKGROUND OF THE INVENTION

1. Field of Invention

The present invention relates generally to the field of Internet searching and electronic matching. More specifically, the present invention is related to a GUI for representing entity matching utilizing graphical transitions performed directly on the matching object.

2. Discussion of Prior Art

The World Wide Web (WWW) is comprised of an expansive network of interconnected computers upon which businesses, governments, groups, and individuals throughout the world maintain inter-linked computer files known as web pages. These web pages contain a multitude of information about people, places, things, etc. Users navigate these pages by means of computer software programs commonly known as Internet browsers. Due to the vastness of the unstructured WWW, users typically use search engines to retrieve information or to locate entities of interest. This sort of access is possible via a pull operation.

A pull operation is the process via which data is requested (by a user) from another program or computer. The opposite of pull is push, where data is sent without a request being made. The terms push and pull are used frequently to describe data sent over the Internet. The World Wide Web is based on pull technologies, where a page isn't delivered until a browser requests it. Increasingly, however, information services are harnessing the Internet to broadcast information using push technologies.

Applications, running on behalf of businesses, governments, groups, and individuals can support a community of users. An example of this can be a generic portal site, such as Yahoo® or Excite®, or sites tailored to specialized information (e.g., a stock trading site), or sites dedicated to specific groups of people (e.g., bicyclists or women). These sites can maintain a body of information, organized in a logical hierarchical fashion that the user can access. Given that the user is a member of this community (i.e., is registered), the maintaining organization can have knowledge about the user (e.g., name, location, preferences). With this user knowledge, the maintaining organization can push information that it believes is of interest to the user. A basic example is the weather, wherein with the knowledge of a user's zip code or city, the maintaining organization can push a weather forecast for the user's area to the user. It can also push local news stories or events that relate to the user's interests. It can also inform the user of other people that it determines are similar to the user.

Search engines are in the business of finding matches to a user's search request. They typically depict relevance/accuracy via various methods, such as the order in which the search results are displayed or associating some number of stars to the search results.

FIG. 1 illustrates a prior art scenario, wherein, based on a search query, a search engine returns items that match the search criteria entered by a user. The relevancy of the matched item with the search criteria is indicated using stars. A maximum of five stars is used in this example to indicate a perfect match (100%) and a lone star indicates a poor match (0%). One problem associated with these kinds of matching systems is that there are only predetermined discrete levels of matching that can be indicated. For the example illustrated in FIG. 1, the different levels of matching are outlined in Table 1.

TABLE 1

Scores and corresponding levels (or match percentages).

| Score (Out of 5 Stars) | Level or Match Percentage |
| --- | --- |
| ***** | 100% |
| **** | 75% |
| *** | 50% |
| ** | 25% |
| * | 0% |

As illustrated in Table 1, the levels available for matching in this example are limited. In the instance a first document matches a query by 70%, and a second document matches the same query by 80%, the scoring system is unable to distinguish between these percentages, and thus bin both these percentages with the same score of four stars. Furthermore, prior art systems are unable to provide for a matching system that visually indicates the level of matching while simultaneously providing matching based on a broad range of levels.

Whatever the precise merits, features and advantages of the above cited references, none of them achieve or fulfills the purposes of the present invention. These and other objects are achieved by the detailed description that follows.

SUMMARY OF THE INVENTION

The present invention provides for a graphical user interface (GUI) for representing entity matches utilizing graphical transitions performed directly on the matching object. Furthermore, the present system and method provide for a graphical transition of matching objects based on type of entity and match rating. The transition techniques employed (such as blurring, composite, and fantasy) reflect the spectrum of an inaccurate to an accurate match. The GUI represents the match results among a number of entities of the same type.

The present invention, in its preferred embodiment, requests a match determination, and a match rating, based on the match determination, is obtained. Next, a transition technique is selected and an image object is rendered based on a graphical transition, which in turn is based on the match rating. The graphical transition gives a visual indication of the quality of the match based on the completeness, resolution, etc.

BRIEF DESCRIPTION OF THE DRAWINGS

FIG. 1 illustrates a prior art scenario, wherein, based on a search query, a search engine returns items that match the search criteria entered by a user.

DESCRIPTION OF THE PREFERRED EMBODIMENTS

Figure 2:
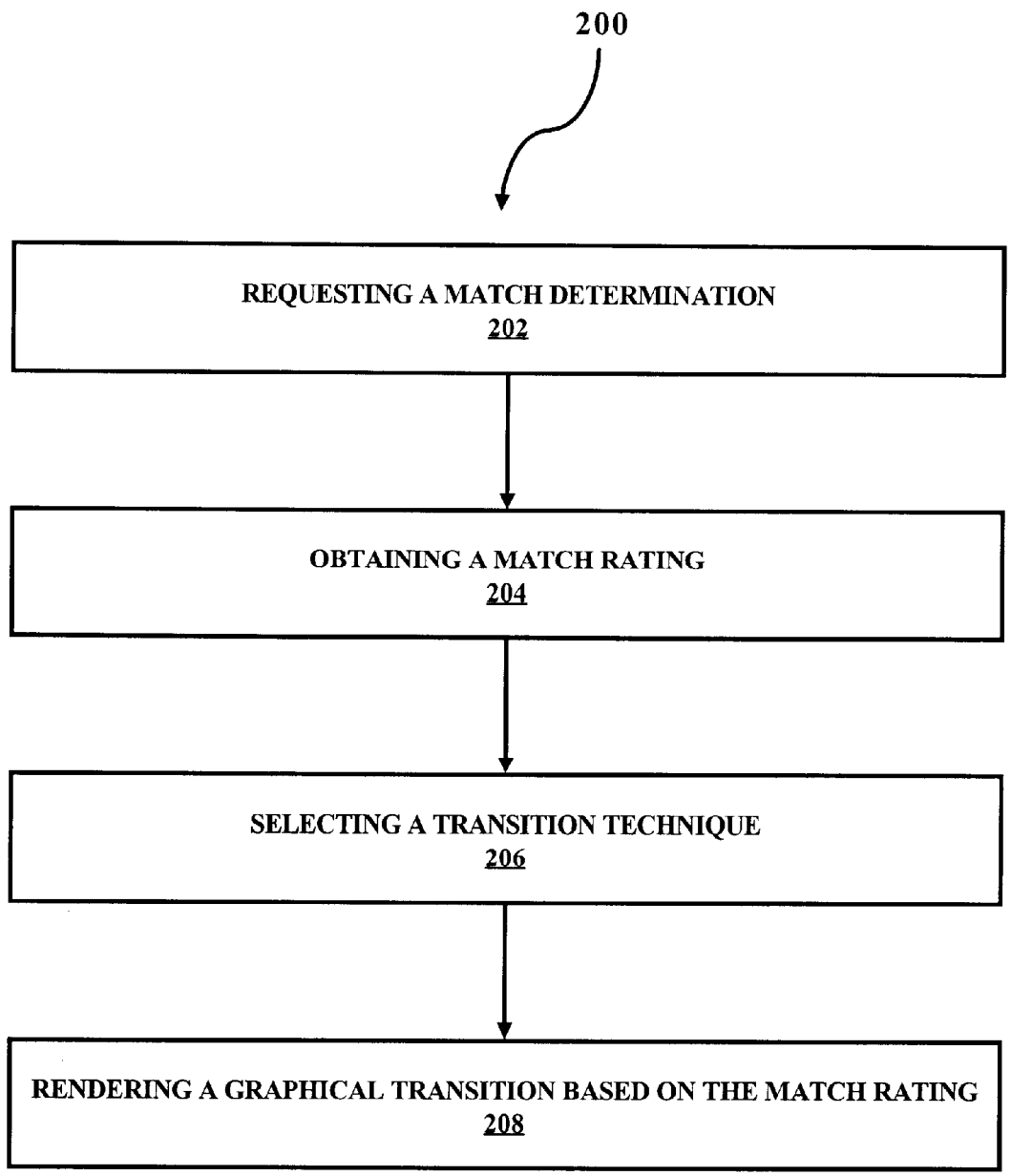
FIG. 2 illustrates general method associated with the preferred embodiment of the present invention.

While this invention is illustrated and described in a preferred embodiment, the invention may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications, and is not intended to limit the invention to the embodiment illustrated. Those skilled in the art will envision many other possible variations within the scope of the present invention.

Regardless of how information is obtained or accessed (pushed or pulled), a mechanism is needed to represent the degree to which a match among entries occurs. Some common examples of matching representations are given below:

representing the similarity between people (a result of comparing their traits and attributes).

representing a vacation spot most in tune with the likes of a person representing the similarity between stock portfolios representing the results of a search via a search engine Search engines are in the business of finding matches to a user's search request. They typically depict relevance/accuracy via various methods, such as the order in which the search results are displayed or associating some number of stars to the search results. The technique of displaying stars (or some other image) and varying their number based on the relevance of the search result is useful, however the present invention uses a transition to reflect the spectrum of an inaccurate to an accurate match. Many differences exist between the above-described methods and the present invention, some of which are outlined below:

Granularity

Using an image that repeats to indicate a better match result (e.g., 4 stars vs. 1 star) requires additional space requirements and would typically be limited to some maximum number (probably 4 or 5). Therefore this approach is limited in the granularity that it can represent. In the case of a 4 star maximum, only a 0, 25, 50, and 100% match can be represented. The present invention supports infinite variability, as the image is changed qualitatively, not quantitatively.

Representation

The present invention performs graphical transitions directly on a matching object itself and then uses that resulting matching object to represent the degree to which entities match. This is in contrast to generating an artificial match indicator, such as stars.

Dynamic

The present invention dynamically alters the image used to represent a match based on the type of entity being matched. This is in contrast to using the same mechanism regardless of the match entities.

Thus, the present invention provides for a graphical user interface (GUI) for representing entity matches utilizing graphical transitions performed directly on the matching object. The present invention provides the functionality of performing graphical transitions directly on a matching object and then using the resulting matching object to represent the degree to which entities match. Also, the transition technique and matching object are dynamically selected based on the match criteria available at the time. Thus, it uses visuals that the user is already familiar with, with respect to the entity being matched (a photograph vs. some arbitrary indicator), so that the user can quickly see the accuracy of the match. Its spectrum of representation is infinitely variable. This invention is suitable for displaying match results of any entities, and one skilled in the art will recognize that the scope of the present invention is not limited to search engine results. The number of entities involved in any match request ranges from two (person A: person X) to many (person A: person X, person Y, and person Z).

Consider a specific example wherein person A would like to determine if person X is a good match in terms of personal interests (e.g., sports and recreation, entertainment). Both person A and person X are members of a Web community. Person A, while navigating the community's website, comes across information and a picture of person X. Person A requests that a match determination be performed between himself and person X. Using a matching algorithm, which is outside the scope of this invention, a match is obtained. Given the match object, in this case the photograph of person X, a transition technique is selected. The match object then undergoes a graphical transition based on the match rating.

FIG. 2 illustrates general method 200 associated with the preferred embodiment of the present invention. First, a user requests a match determination 202. This request can be queried via various means including a search engine. Next, a match rating is obtained 204 from a source such as a search engine. Furthermore, a transition technique is selected 206 that defines the kind of transition that is to be applied to the match object. Lastly, a graphical user interface (GUI) renders a graphical transition 208 of the match object based on the resultant match rating.

Figure 3:
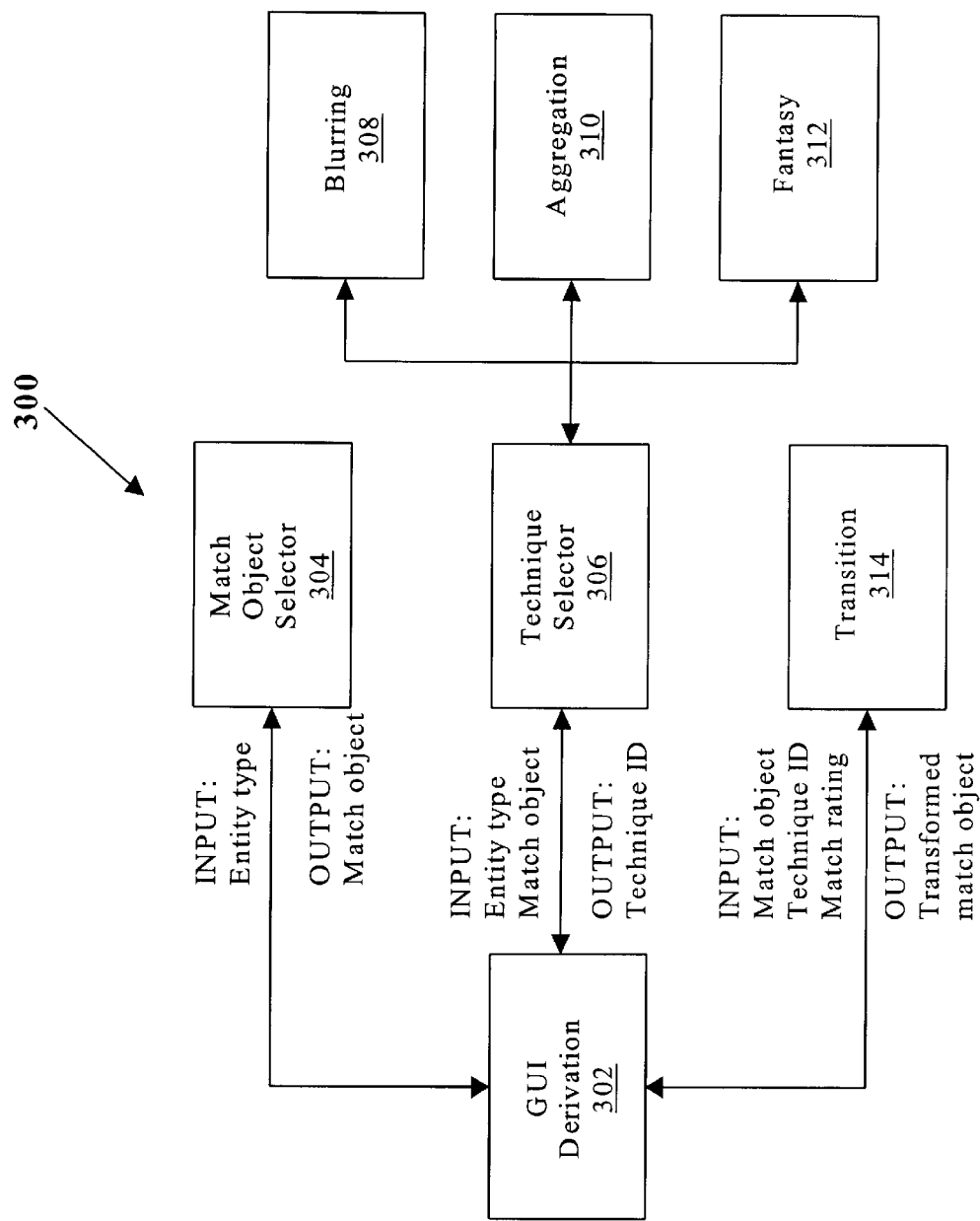
FIG. 3 illustrates the system identifying the components, including inputs and outputs, involved in transitioning a match object based on a match rating.

FIG. 3 illustrates the system 300 identifying the components, including inputs and outputs, involved in transitioning a match object based on a match rating. GUI 302 first uses match object selector 304 to select a matching object (e.g., a photograph). Next, after matching is performed, technique selector 306 helps identify a transition technique. Some transition technique choices include, but are not limited to: blurring technique 308, composition technique 310, or fantasy technique 312. Lastly, after identifying a transition technique, the actual transition 314 is performed on the matching object.

Examples of three transition techniques are outlined below, although it should be noted that one skilled in the art can recognize that the present invention should not be restricted in scope to just these techniques.

Blurring

In this technique, the matching object is partially blurred, the percent of blurring depending on the match result. Considering the same example described above, the match object, in this case a photograph, is partially blurred, wherein the percent of the blur depends on the match. Thus, for a 0% match, the photograph is sufficiently blurred to make it unrecognizable. Furthermore, the present invention provides for a whole spectrum of possibilities ranging from 0% (no match) to 100% (total match).

Figure 4A:
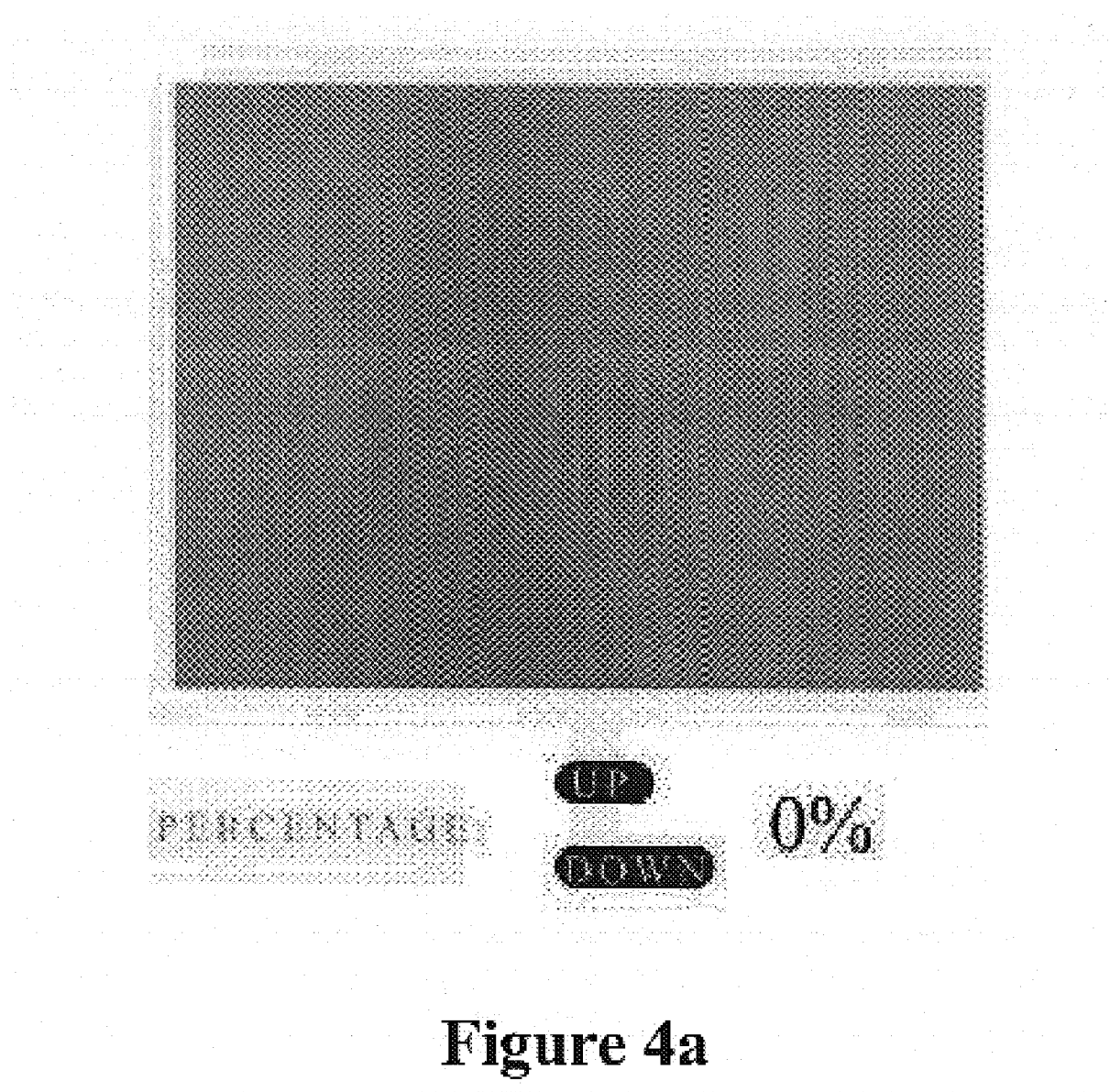
FIGS. 4a–g collectively illustrate the blurring transition technique of the present invention.
Figure 4B:
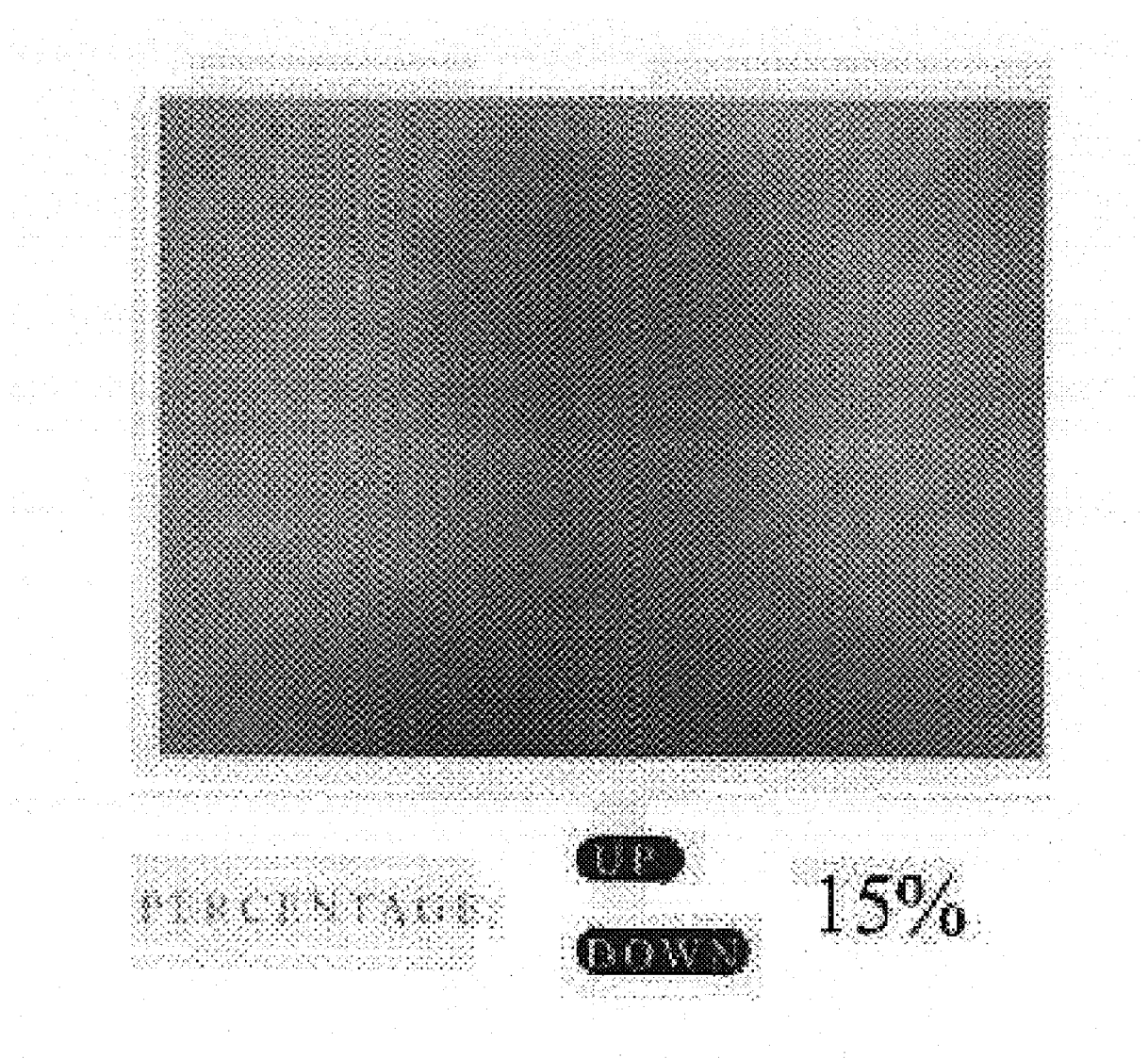
Figure 4C:
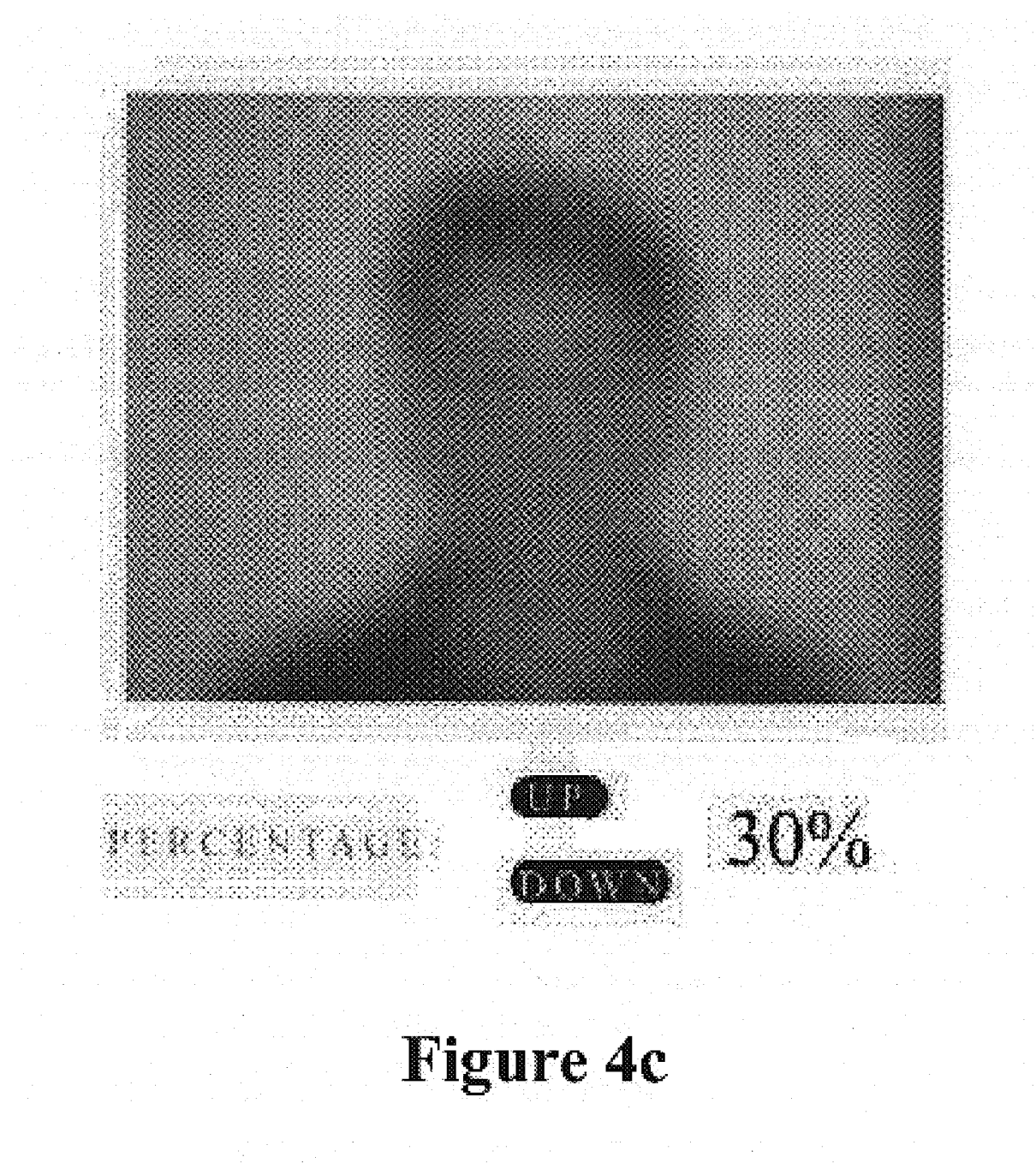
Figure 4D:
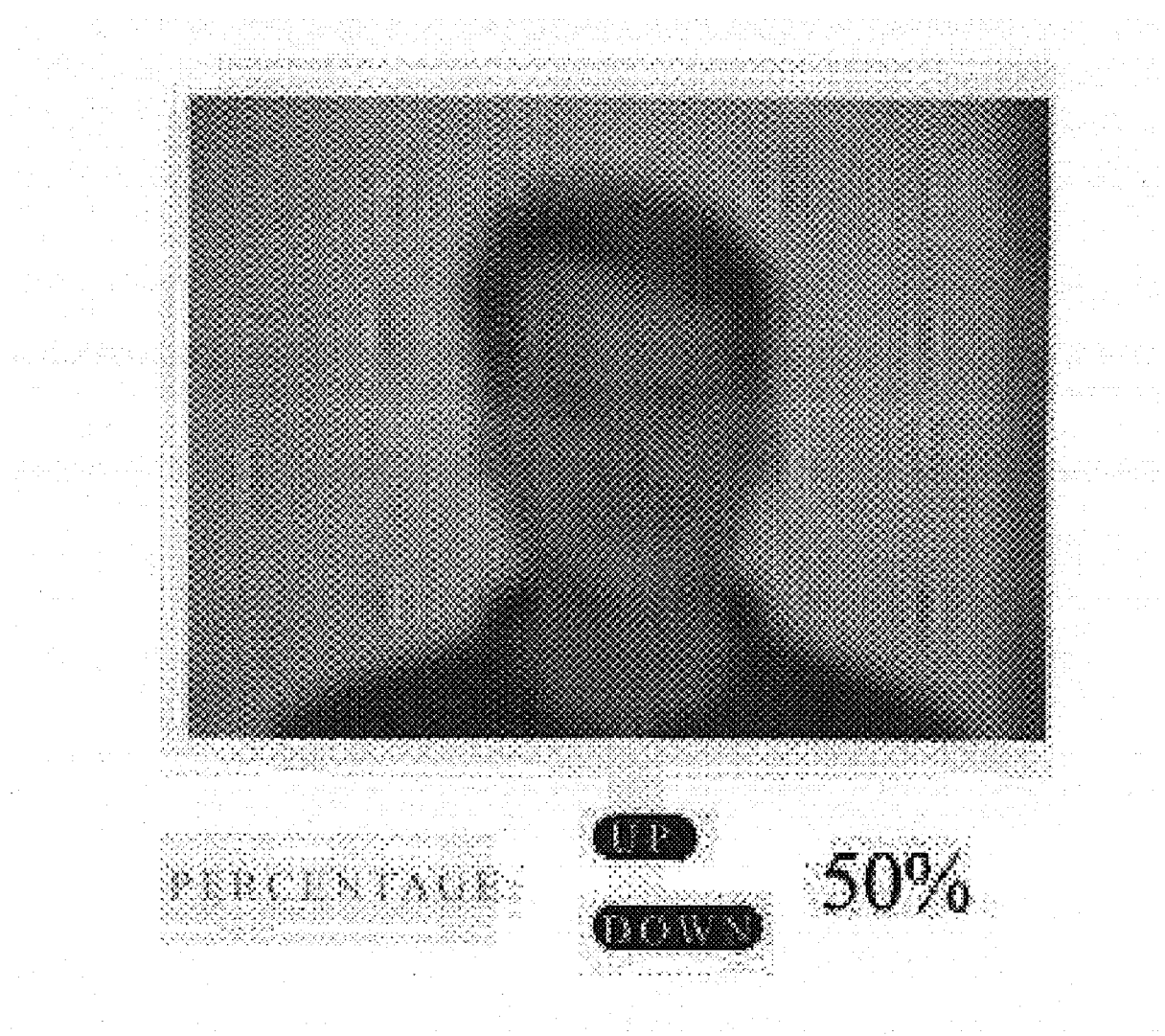
Figure 4E:
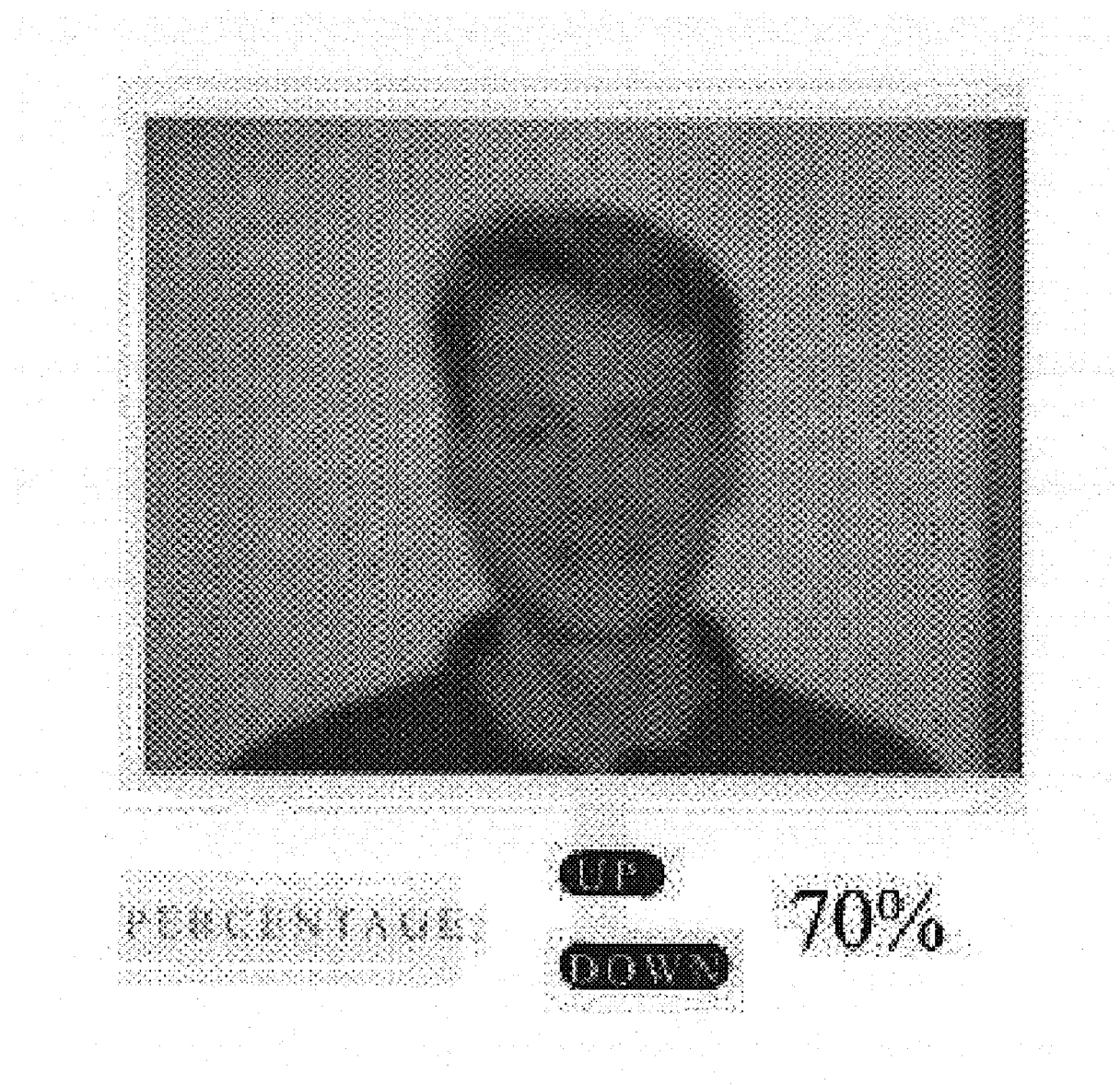
Figure 4F:
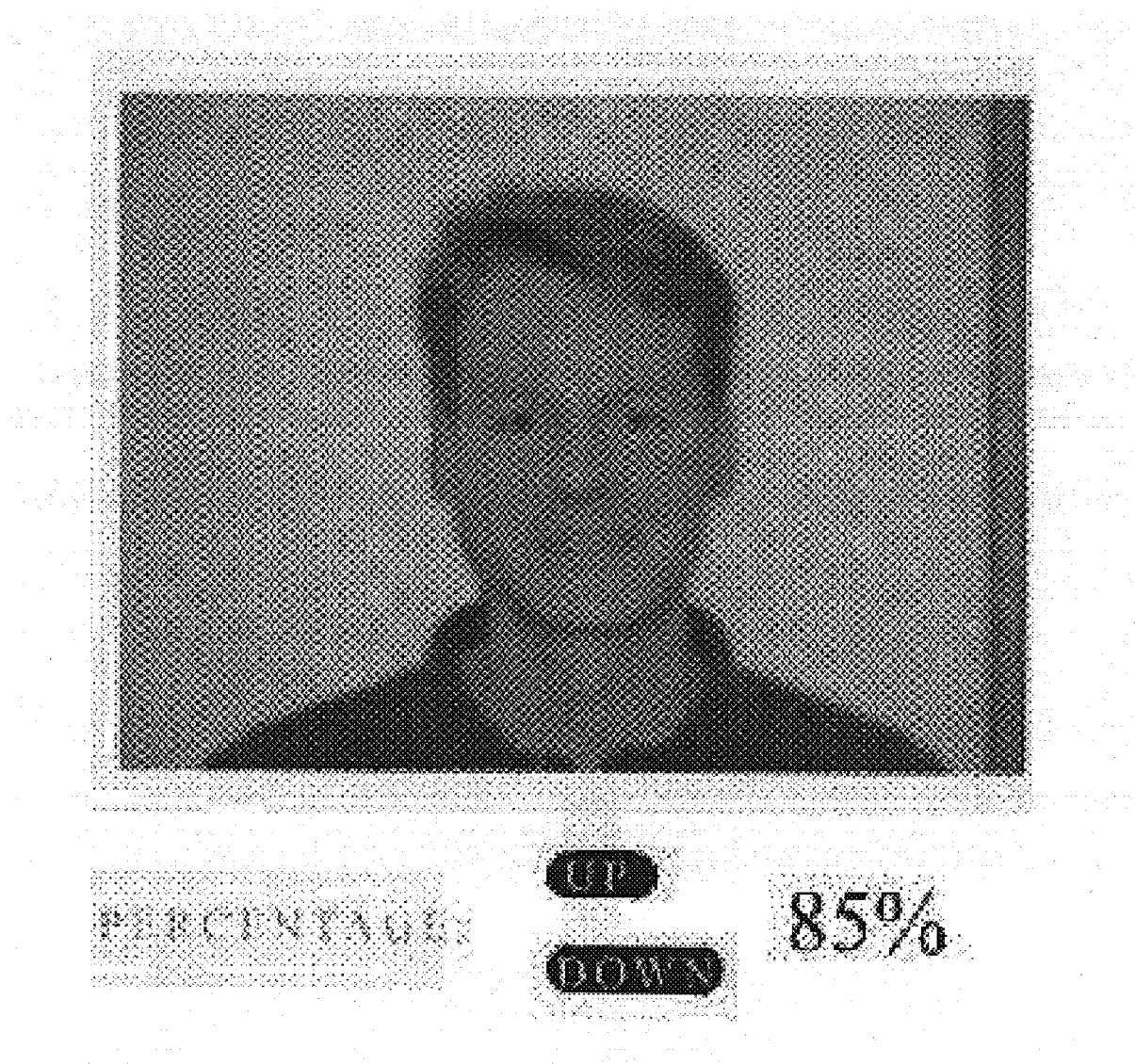
Figure 4G:
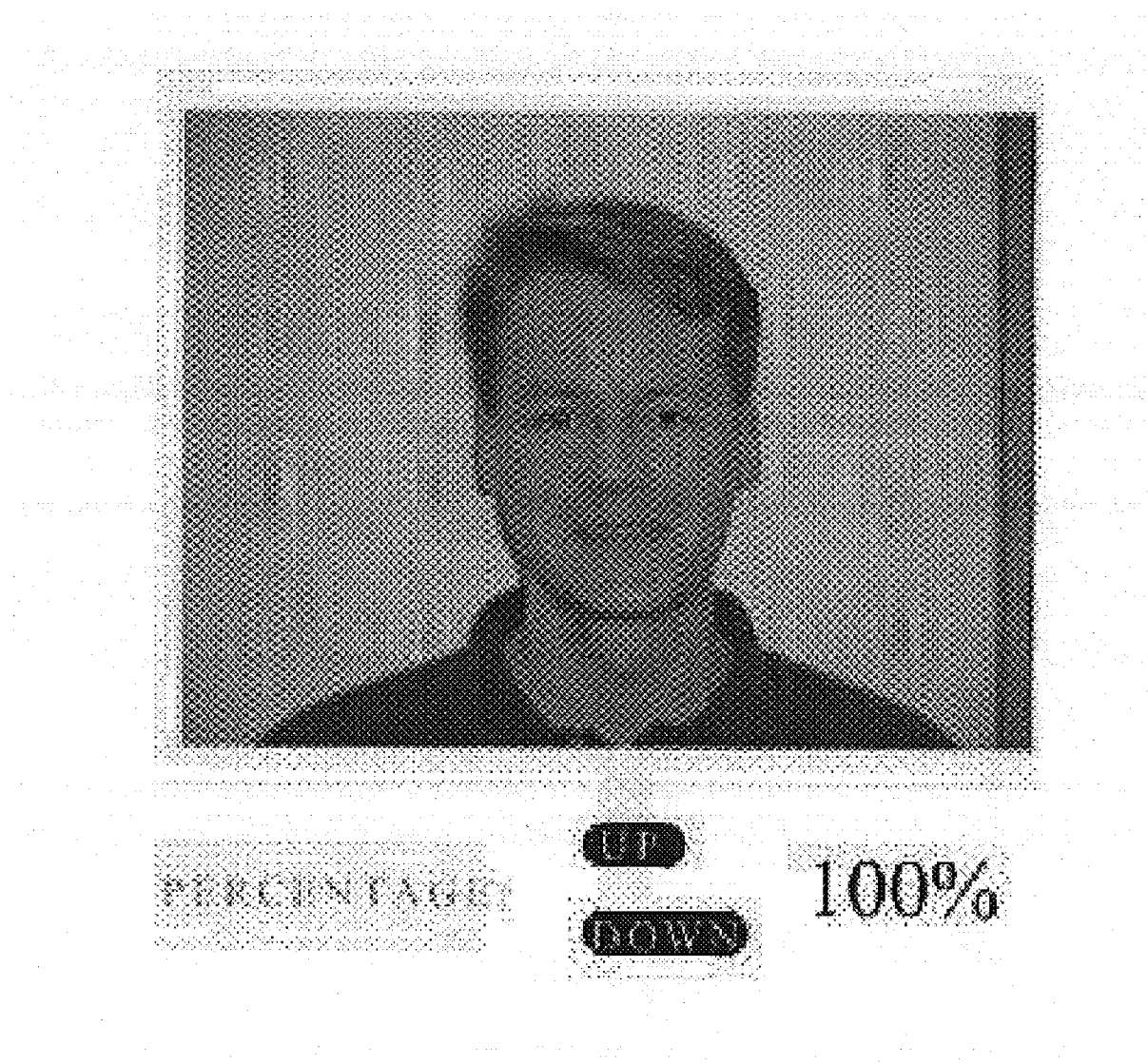

FIGS. 4*a–g* collectively illustrate the blurring technique wherein the percent of blurring depends on the match result. For example, as illustrated in FIG. 4*a*, in the event of a 0% percent match, the photograph is blurred beyond the point of recognition, and as shown in FIG. 4*g*, which illustrates a 100% match, the photograph is clear and recognizable.

Composition

In this technique, the matching object is built up of pieces (e.g., body parts for people) which relate to the entities being matched. The percent of build up depends on the match result.

Figure 5:
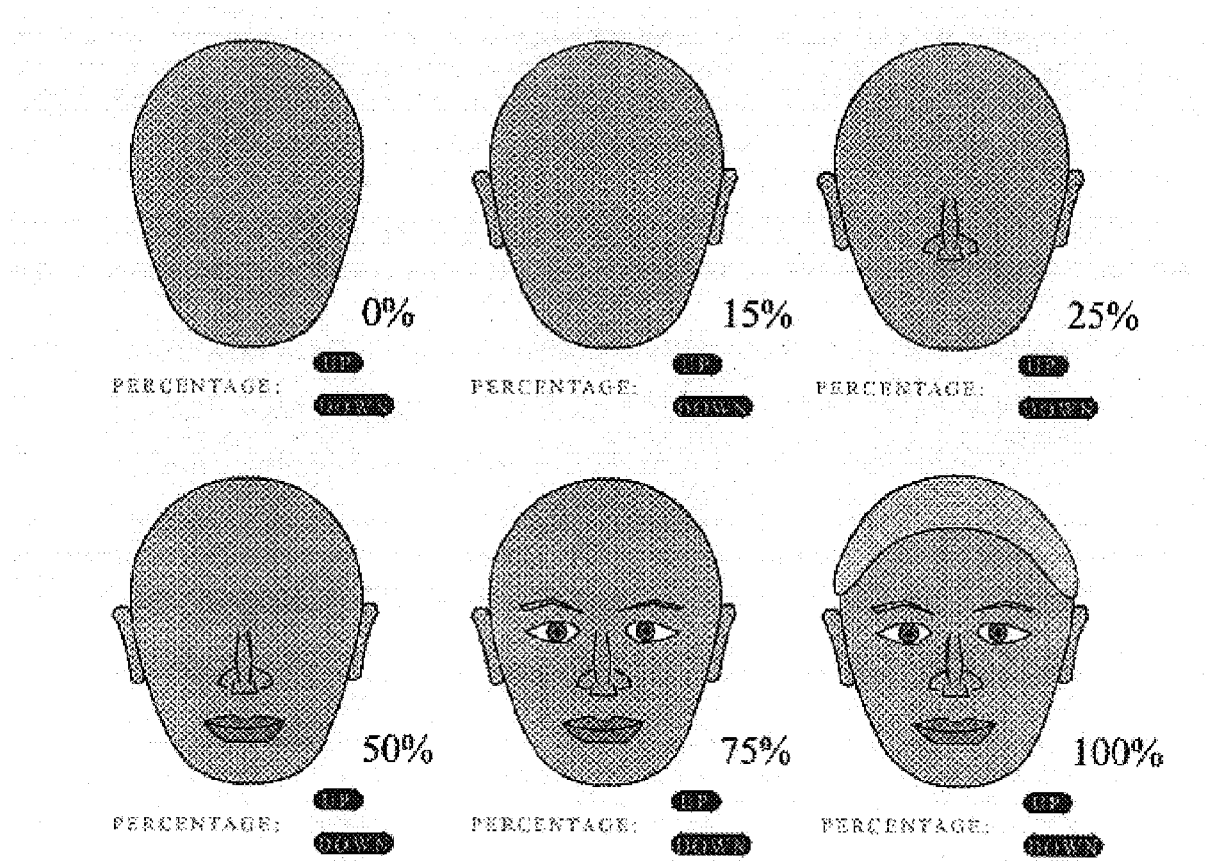
FIG. 5 illustrates the composition transition technique of the present invention.

FIG. 5 illustrates the composition technique. In the instance of a non-match of 0%, the GUI renders a face with no parts. On the other hand, in the instance of a perfect match (100%), the GUI renders a face with various parts (such as eyes, nose, lips, and hair).

Fantasy

In this technique, the resulting matching object resides within the spectrum of fantasy and reality. No match (0%) is represented as complete fantasy. A complete match (100%) is represented as reality (e.g., a photograph).

Figure 6A:
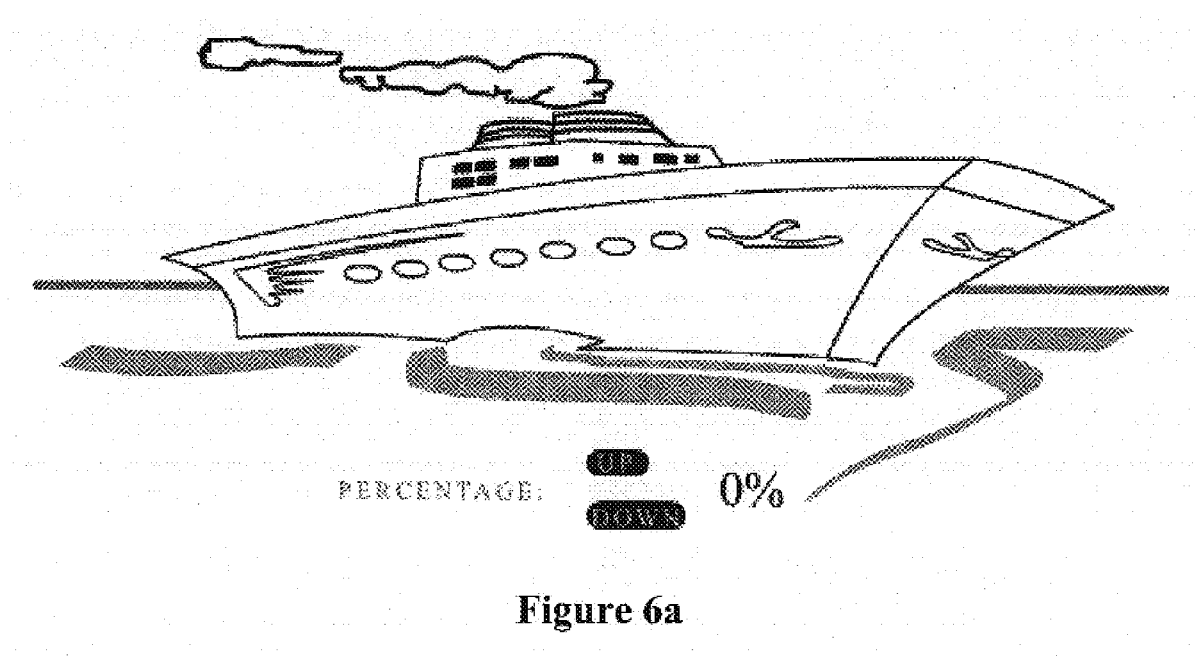
FIGS. 6a–c collectively illustrate the fantasy transition technique of the present invention.
Figure 6B:
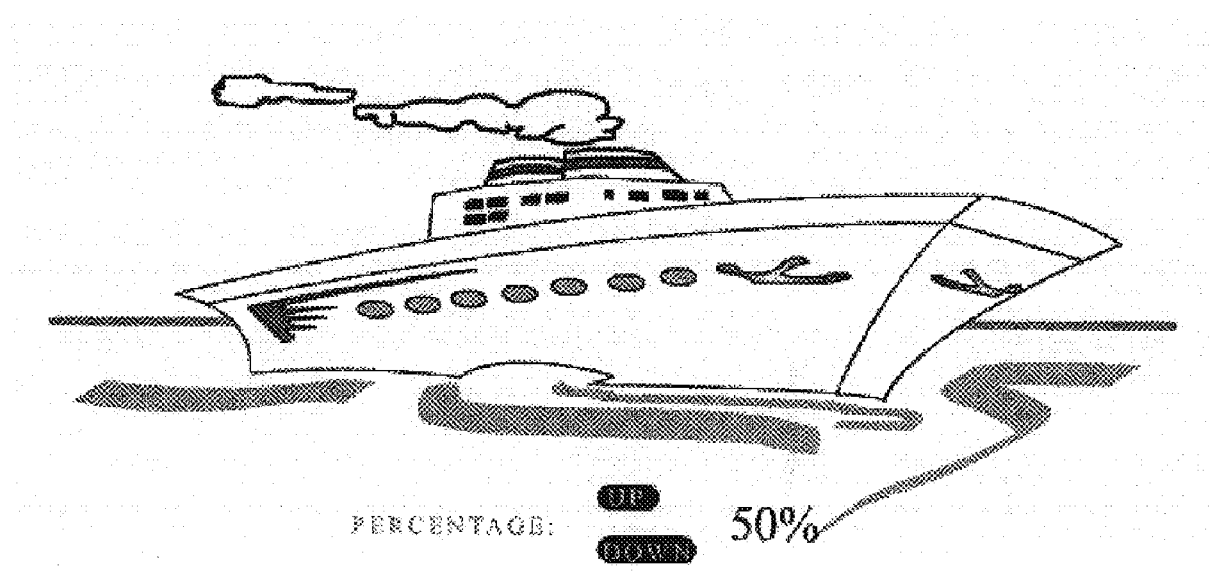
Figure 6C:
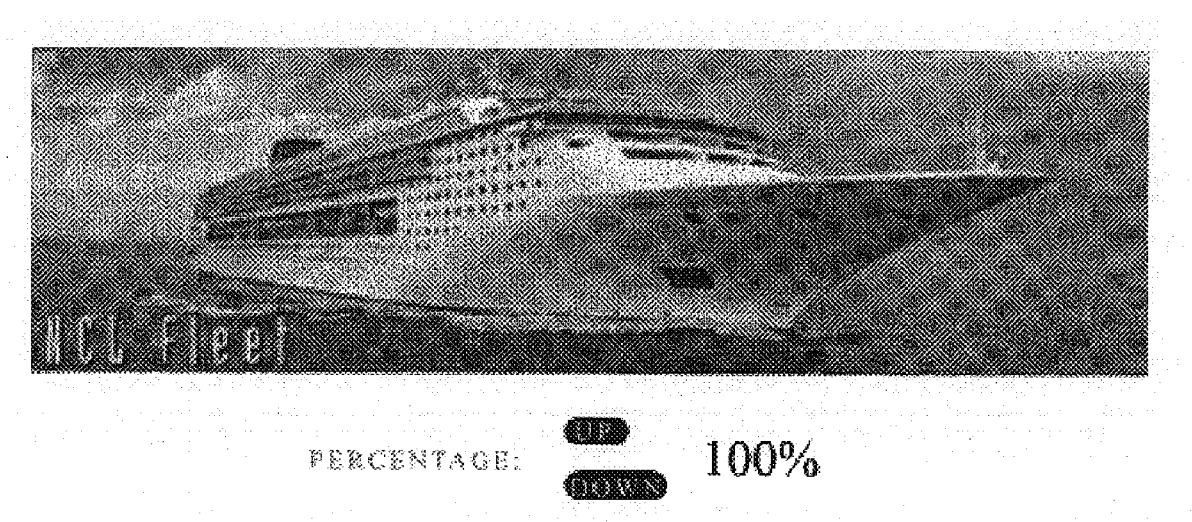

FIGS. 6a–c collectively illustrate the fantasy technique wherein a complete mismatch (0%), as shown in FIG. 6a, results in the GUI rendering an image representative of a complete fantasy. In this example a complete mismatch is represented by a cartoon image of a ship. In the instance of a perfect match (100%), the GUI renders an actual picture or a photograph of a ship, as shown in FIG. 6c.

Thus, the present invention provides for a system and a method for representing entity matching utilizing graphical transitions performed directly on the matching object. The three transition techniques described include blurring, composition, and fantasy. One skilled in the art can however recognize that the scope of the present invention is not restricted to these techniques.

The above enhancements for matching, using graphical transitions performed directly on the matching object, are implemented in various computing environments. For example, the present invention may be implemented on a conventional IBM PC or equivalent, multi-nodal system (e.g. LAN) or networking system (e.g. Internet, WWW, wireless web). All programming, GUIs, and data related thereto are stored in computer memory, static or dynamic, and may be retrieved by the user in any of: conventional computer storage, display (i.e. CRT) and/or hardcopy (i.e. printed) formats. The programming of the present invention may be implemented by one of skill in the art of graphics or network and web-based programming.

Conclusion

A system and method has been shown in the above embodiments for the effective implementation of a graphical user interface (GUI) that utilizes graphical transitions that are performed directly on the matching objects. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware. In addition, the specific chosen transition techniques are representative of the preferred embodiment and should not limit the scope of the invention.

What is claimed is:

1. A computer-based method for representing entity matches utilizing graphical transitions performed directly on a matching object, said method comprising:
   identifying a matching object;
   requesting a match determination;
   obtaining a match rating;
   selecting one of the following transition techniques: a composition technique representing matching objects via a build-up of pieces, with the percentage of build-up depending on match rating, or a fantasy technique representing matching objects using a graphical representation that resides between a spectrum of fantasy and reality based on said match rating; and
   rendering said matching object based on said selected transition technique.

2. A computer-based method for representing entity matches utilizing graphical transitions performed directly on a matching object, as per claim 1, wherein said rendered object representative of the fantasy end of the spectrum is a cartoon image corresponding to a poor match and said rendered object representative of the reality end of the spectrum is a photograph corresponding to a perfect match.

3. A computer-based method for representing entity matches utilizing graphical transitions performed directly on a matching object, as per claim 1, wherein step of obtaining a match rating is accomplished via a search engine.

4. A computer-based method for representing entity matches utilizing graphical transitions performed directly on a matching object, as per claim 1, wherein said matching object is any of the following: photograph, icon, figure, graph, or banner.

5. A computer-based method for representing entity matches utilizing graphical transitions performed directly on a matching object, as per claim 1, wherein said step of match determination is performed over a network.

6. A computer-based method for representing entity matches utilizing graphical transitions performed directly on a matching object, as per claim 5, wherein said network comprises any of the followings networks: HTTP-based, Internet, wide area network (WAN), local area network (LAN), wireless-based, or telecommunication-based.

7. A computer-based method for representing entity matches utilizing graphical transitions performed directly on a matching object, as per claim 1, wherein said matching object is rendered along with said obtained match rating.

8. A computer-based system for representing entity matches utilizing graphical transitions performed directly on a matching object, said system comprising:
   a match object selector, identifying and selecting a match object;
   a technique selector, selecting one of the following techniques for graphical transitions: a composition technique representing matching objects via a build-up of pieces with the percentage of build-up depending on a match rating, or a fantasy technique representing matching objects using a graphical representation that resides between a spectrum of fantasy and reality based on said match rating; and
   a transition system, rendering a resultant match object by performing graphical transitions on said identified and selected match object using said selected technique.

9. A computer-based system for representing entity matches utilizing graphical transitions performed directly on a matching object, as per claim 8, wherein said rendered object representative of the fantasy end of the spectrum is a cartoon image corresponding to a poor match and said rendered object representative of the reality end of the spectrum is a photograph corresponding to a perfect match.

10. A computer-based system for representing entity matches utilizing graphical transitions performed directly on a matching object, as per claim 8, wherein said match rating is obtained via a search engine.

11. A computer-based system for representing entity matches utilizing graphical transitions performed directly on a matching object, as per claim 8, wherein said matching object is any of the following: photograph, icon, figure, graph, or banner.

12. A computer-based system for representing entity matches utilizing graphical transitions performed directly on a matching object, as per claim 8, wherein said match determination is performed over a network.

13. A computer-based system for representing entity matches utilizing graphical transitions performed directly on a matching object, as per claim 12, wherein said network comprises any of the followings networks: HTTP-based, Internet, wide area network (WAN), local area network (LAN), wireless-based, or telecommunication-based.

14. A computer-based system for representing entity matches utilizing graphical transitions performed directly on a matching object, as per claim 8, wherein said transition system additionally renders said obtained match rating along with said matching object.

15. An article of manufacture comprising a computer user medium having computer readable code embodied therein which matches entities using graphical transitions performed directly on a matching object, said article comprising:

computer readable program code identifying a matching object;

computer readable program code requesting a match determination;

computer readable program code obtaining a match rating;

computer readable program code selecting one of the following transition technique; a composition technique representing matching objects via a build-up of pieces, with the percentage of build-up depending on a match rating, or fantasy technique representing matching objects using a graphical representation that resides between a spectrum of fantasy and reality based on said match rating; and computer readable program code rendering said matching object based on said selected transition technique.

16. An article of manufacture comprising a computer user medium having computer readable code embodied therein which matches entities using graphical transitions performed directly on a matching object, as per claim 15, wherein said medium further comprises computer readable program code rendering said obtained match rating along with said matching object.

17. An article of manufacture comprising a computer user medium having computer readable code embodied therein which matches entities using graphical transitions performed directly on a matching object, as per claim 15, wherein said rendered object representative of the fantasy end of the spectrum is a cartoon image corresponding to a poor match and said rendered object representative of the reality end of the spectrum is a photograph corresponding to a perfect match.

* * * * *